US009565357B2

(12) United States Patent
Iwasaki et al.

(10) Patent No.: US 9,565,357 B2
(45) Date of Patent: Feb. 7, 2017

(54) IMAGE PICKUP APPARATUS, AND IMAGE CORRECTION METHOD

(71) Applicant: Olympus Corporation, Hachioji-shi, Tokyo (JP)

(72) Inventors: Hiroaki Iwasaki, Hino (JP); Manabu Ichikawa, Hachioji (JP); Osamu Nonaka, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/208,729

(22) Filed: Jul. 13, 2016

(65) Prior Publication Data

US 2016/0323502 A1 Nov. 3, 2016

Related U.S. Application Data

(63) Continuation of application No. 14/274,382, filed on May 9, 2014, now Pat. No. 9,420,192.

(30) Foreign Application Priority Data

May 10, 2013 (JP) ................................. 2013-100344

(51) Int. Cl.
*H04N 5/232* (2006.01)
*H04N 5/235* (2006.01)

(52) U.S. Cl.
CPC ........ *H04N 5/23216* (2013.01); *H04N 5/2351* (2013.01); *H04N 5/23293* (2013.01)

(58) Field of Classification Search
CPC .............. H04N 5/2351; H04N 5/23216; H04N 5/23293; H04N 5/2621; H04N 5/357; H04N 5/235; H04N 5/243
See application file for complete search history.

(56) References Cited

U.S. PATENT DOCUMENTS

| 2009/0135295 | A1* | 5/2009 | Kunishige | .......... | H04N 5/23232 348/362 |
| 2013/0162880 | A1* | 6/2013 | Yun | .................... | H04N 5/23216 348/333.11 |
| 2014/0333801 | A1* | 11/2014 | Moon | .................. | H04N 1/2145 348/231.99 |

* cited by examiner

*Primary Examiner* — Albert Cutler
(74) *Attorney, Agent, or Firm* — John C. Pokotylo; Straub & Pokotylo

(57) ABSTRACT

To provide an image pickup apparatus which enables acquisition, by a simple configuration, of a natural image of a dark place or the like at the time of image pickup in a dark environment by eliminating an influence from the surrounding environmental light, an image pickup apparatus of the invention includes an image pickup section for picking up an image of an object and acquiring an image signal, an accumulation section for sequentially accumulating outputs from the image pickup section, a display section for visibly displaying an accumulated image signal of the accumulation section, a position identification section for identifying a position specified on an image displayed on the display section; and a correction section for performing an image correction process on the accumulated image signal of the accumulation section according to an identification result of the position identification section.

18 Claims, 12 Drawing Sheets

IMAGE PICKUP APPARATUS, AND IMAGE CORRECTION METHOD

CROSS-REFERENCE TO RELATED APPLICATIONS

This application is a Continuation application of U.S. patent application Ser. No. 14/274,382 (referred to as "the '382 application" and incorporated herein by reference), filed on May 9, 2014, titled "IMAGE PICKUP APPARATUS, AND IMAGE CORRECTION METHOD" and listing Hiroaki IWASAKI, Manabu ICHIKAWA and Osamu NONAKA as the inventors, the '382 application claiming the benefit of Japanese Application No. 2013-100344 filed in Japan on May 10, 2013, the contents of which are incorporated herein by this reference.

BACKGROUND OF THE INVENTION

1. Field of the Invention

This invention relates to an image pickup apparatus and an image correction method allowing appropriate black balance correction in image pickup in a dark environment.

2. Description of the Related Art

Conventionally, an image pickup apparatus that is capable of sequentially converting optical images formed by an image pickup optical system into image signals by a photoelectric conversion device or the like and of storing the image signals thus obtained in a storage medium as pieces of image data of a predetermined format, and configured by including an image display device, for example, a liquid crystal display (LCD), that reproduces/displays the image data stored in the storage medium as an image, such as a digital camera or a camcorder (hereinafter referred to collectively as camera(s)), has been put to practical use and widely used.

When using this type of camera and performing image pickup of a night scene by a long exposure, for example, if the exposure time is long, artificial light from street lamps, neon lights or the like may affect the entire screen. For example, a region in the screen which is supposed to be dark, such as a region of night sky, may not be black, and may be shown to be brighter than it looked due to the influence of artificial light or the like, or faint light images of stars or the like may be erased. Also, the original color of a target object in a dark place may not be reproduced due not only to the artificial light, but also to unintentional diffraction of environmental light.

Accordingly, various proposals are conventionally made in, for example, Japanese Patent Application Laid-Open Publication No. 2005-45558, with respect to an image correction processing technique for acquiring an image that is closer to the way of being seen by human beings by taking into account the influence of harmful light such as artificial light.

An image pickup apparatus disclosed in Japanese Patent Application Laid-Open Publication No. 2005-45558 mentioned above performs black balance control of correction in a neutral axis direction, also in the case the darkest point in the image is shifted from a neutral axis, by taking into account the adaptation effect of human eyes to black (the rate of dark adaptation).

SUMMARY OF THE INVENTION

An image pickup apparatus of an aspect of the present invention includes an image pickup section for picking up an image of an object and acquiring an image signal, an accumulation section for sequentially accumulating outputs from the image pickup section, a display section for visibly displaying an accumulated image signal of the accumulation section, a position identification section for identifying a position specified on an image displayed on the display section; and a correction section for performing an image correction process on the accumulated image signal of the accumulation section according to an identification result of the position identification section An image correction method of an aspect of the present invention includes steps of picking up an image of an object and acquiring an image signal by an image pickup section, sequentially accumulating outputs from the image pickup section by an accumulation section, visibly displaying an accumulated image signal of the accumulation section using a display section, identifying a position specified on an image displayed on the display section by a position identification section; and performing a correction process, by a correction section, on the accumulated image signal of the accumulation section according to an identification result of the position identification section.

The advantages of this invention will be further clarified by the following detailed description.

Figure 1:
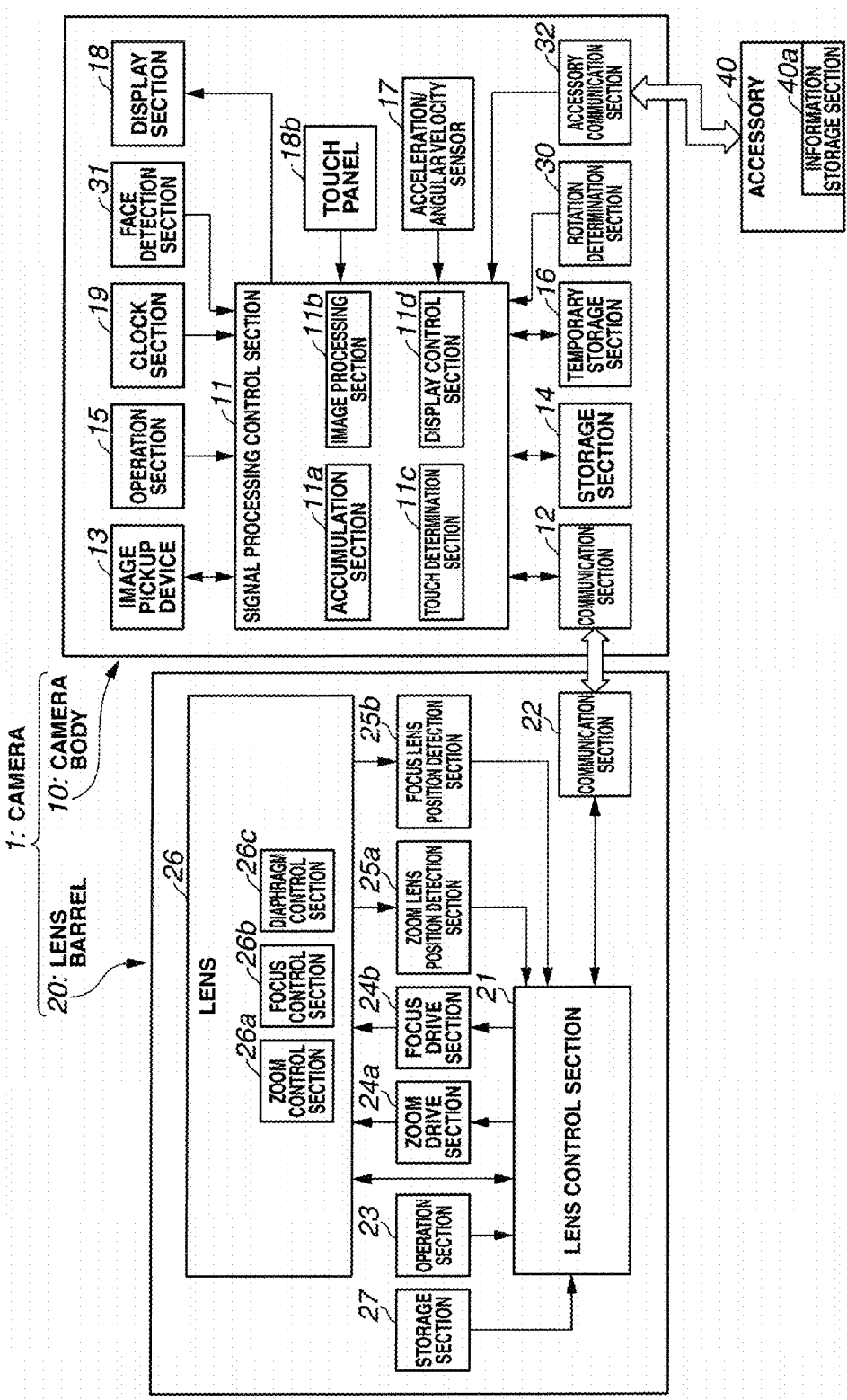
FIG. 1 is a block configuration diagram schematically showing a main internal configuration of an image pickup apparatus (camera) of an embodiment of the present invention.

DETAILED DESCRIPTION OF THE
PREFERRED EMBODIMENTS

Hereinafter, the present invention will be described with reference to embodiments shown in the drawings. In each of the drawings used in the following description, the scale of display of each structural component may be different such that each structural component is large enough to be recognized in the drawing. Accordingly, the present invention is not restricted to the modes shown in the drawings with respect to the number of structural components, the shapes of the structural components, the proportion of the sizes of the structural components, and the relative positional relationship of respective structural components.

Each embodiment of the present invention described below illustrates, as an image pickup apparatus to which the present invention is applied, an image pickup apparatus (hereinafter referred to simply as "camera") configured to be capable of photoelectrically converting, by using a solid-state image pickup device, an optical image formed by an optical lens or the like, of storing an image signal thus obtained in a storage medium as digital data representing a still image or a movie, and also, of reproducing/displaying the still image or the movie on a display device based on the digital image data stored in the storage medium.

First, a schematic configuration of a camera which is an image pickup apparatus according to an embodiment of the present invention will be described. FIG. 1 is a block configuration diagram showing a main internal configuration of an image pickup apparatus (camera) of an embodiment of the present invention.

As shown in FIG. 1, a camera 1, which is the image pickup apparatus of the present embodiment, is configured from a camera body 10, and a lens barrel 20. The camera 1 is a so-called interchangeable lens camera configured in such a way that the lens barrel 20 may be freely attached/detached with respect to the camera body 10. Note that the present embodiment gives a description citing the interchangeable lens camera as an example, but a camera to which the present invention may be applied is not limited to such mode, and application to a camera which is configured by integrating the camera body 10 and the lens barrel 20, for example, is possible in exactly the same manner.

The camera body 10 is configured by including a signal processing control section 11, a body-side communication section 12, an image pickup device 13, a storage section 14, an operation section 15, a temporary storage section 16, an acceleration/angular velocity sensor 17, a display section 18, a touch panel 18b, a clock section 19, a rotation determination section 30, a face detection section 31, an accessory communication section 32, and the like.

The signal processing control section 11 has a function as a control section for controlling the operation of the camera 1 in an overall manner, and is a circuit section having a function of a signal processing section for processing control signals for controlling various structural units and for performing image signal processing and the like on an image signal (image data) acquired by the image pickup device 13.

Various circuit sections are provided inside the signal processing control section 11, such as an accumulation section 11a, an image processing section 11b, a touch determination section 11c, a display control section 11d, and the like.

Of the above, the accumulation section 11a is an image signal processing circuit section for performing image processing of receiving and accumulating image signals outputted from the image pickup device 13.

The image processing section 11b is a signal processing circuit section for performing various types of image processing based on image data acquired by the image pickup device 13.

The touch determination section 11c is a signal processing circuit for receiving an instruction input signal from the touch panel 18b, and for determining the instruction content. For example, determination processes of determining, when a touch operation on the touch panel 18b is performed, the touch position and the coordinates on the display image on the display section 18, and of identifying, when instruction icon display or the like is performed on the display image on the display section 18, the position (coordinates) corresponding to the icon display or the like are performed. In this manner, the touch determination section 11c functions as a position identification section. Various types of control at the signal processing control section 11 are performed based on the determination result of the touch determination section 11c.

The display control section 11d is a control circuit section for driving and controlling the display section 18. The display control section 11d performs control of receiving image data generated and acquired by an image pickup section including the image pickup device 13, a lens 26, and the like (described below), and of displaying the image data on a display panel of the display section 18 as an image.

The image pickup section mentioned above is a unit configured by including the lens 26 and the like (described below), which is an image pickup optical system that passes light from a target object (object) which is an image pickup target and forms an optical image of the object, and the image pickup device 13 that receives the object image formed by the lens 26 and performs a photoelectric conversion process.

As the image pickup device 13, for example, a photoelectric conversion device, which is a solid-state image pickup device such as an MOS image sensor using a MOS (metal oxide semiconductor) or the like or a CCD image sensor using a circuit element such as a CCD (charge coupled device) or the like, is used. An analog image signal generated by the image pickup device 13 is outputted to, and accumulated by, the accumulation section 11a of the signal processing control section 11, and is then outputted to the image processing section 11b to have various types of image signal processing performed thereon.

The storage section 14 is a structural section configured by including a signal processing circuit section for converting an image signal outputted from the image pickup device 13 and processed by the image processing section 11b into a predetermined format, a storage medium for storing image data generated by the signal processing circuit section, a control section for driving and controlling the storage medium, and the like. The conversion process of an image signal that is performed at this time is a process of conversion into image data of a storing format by a signal compression process or the like, signal processing of restoring an image signal by reading image data stored in the storage medium and performing an extension process thereon, or the like, for example. Note that this type of compression/extension process is not limited to be performed by the signal processing circuit section included in the storage section 14, and may be performed by a similar signal processing circuit section by providing such a section in the signal processing control section 11, for example.

The temporary storage section 16 is a circuit section for temporarily storing image data acquired by the image pickup device 13 and the like, and a semiconductor memory device such as an EEPROM (electrically erasable programmable read only memory), a RAM (random access memory) or the like is used, for example.

The operation section 15 includes various types of operation members, such as an operation member of a normal push button type, a slide type, a dial type or the like, provided to the package portion of the camera body 10 of the camera 1, and refers to structural sections for operation including various general operation members such as a shutter release button (not particularly shown). Note that, as the operation member included in the operation section 15, there is also a so-called four-way operation member, for example. This four-way operation member is used also in the case of selecting an item on a menu screen displayed on the display section 18, or of issuing an instruction regarding a position on a display image, for example. The four-way operation member functions as an alternative operation member to the touch panel 18b described below. An instruction signal from the four-way operation member is outputted to the signal processing control section 11, and position identification or the like is performed by a control circuit in the signal processing control section 11. Accordingly, in this case, the signal processing control section 11 functions as a position identification section for determining a position on an image displayed on the display section 18, for example.

Also, the camera 1 of the present embodiment includes the touch panel 18b as an operation member for operation different from the operation section 15. This touch panel 18b is an operation member arranged on the display surface of the display section 18, and is configured in such a way that various operation instruction signals are generated when an operator (user) performs a touch operation, a slide operation and the like on a predetermined region corresponding to an image being displayed on the display panel. An instruction input signal from the touch panel 18b is sent to the touch determination section 11c of the signal processing control section 11, and the operation input is determined.

The display section 18 is a structural section for performing image display under the control of the display control section 11d based on image data or the like outputted from the image pickup device 13 or image data or the like on which the extension process has been performed by the storage section 14. As the display section 18, a display panel such as a liquid crystal display (LCD), a plasma display (PDP), or an organic electro-luminescence display (OEL) is used, for example. This display section 18 has a function of reproducing/displaying an image based on image data which has been picked up and stored, and also functions as a viewfinder used for observing and checking an image pickup range at the time of an image pickup operation by sequentially and continuously receiving image data outputted from the image pickup device 13 through the image processing section 11b and keep displaying the image. Note that as the display section 18, a small panel to be used as an electric viewfinder (EVF) may also be provided in addition to a display panel provided to the rear surface of the apparatus.

Note that, in the case of a normal camera, the range that can be observed by using the viewfinder is referred to as the field of view of the viewfinder, but as described above, the camera 1 of the present embodiment uses, as the viewfinder, a display device that displays an image based on image data outputted from the image pickup device 13. Thus, the observation image that may be observed by the display section 18, which is the viewfinder, of the camera 1 of the present embodiment is a display image based on the image data. Accordingly, in the following description, the image displayed on the display section 18 as the viewfinder will be referred to as a viewfinder image.

The clock section 19 is an internal clock of a computer called a real-time clock (RTC). The clock section 19 is used at the time of attaching date information of a data file, or of time keeping or time control during a control process, for example.

The acceleration/angular velocity sensor 17 is a detection signal processing circuit section including an angular velocity sensor or the like for detecting the attitude of the camera 1 with respect to the horizontal or vertical direction, that is, the state of inclination (for example, the angle of elevation) with respect to the vertical direction of the optical axis of the image pickup optical system, for determining the attitude state with respect to the way the camera 1 is held, that is, the way of holding at the vertical position or the horizontal position, or in other words, the up-down direction of an image (accelerometer), and for measuring the amount of rotation of the camera 1 around an axis orthogonal to the optical axis. As the acceleration/angular velocity sensor 17, a gyroscope as an angular velocity sensor is used, for example.

The rotation determination section 30 is a determination circuit section for determining whether or not the camera 1 is rotated around the optical axis, and determining the rotation direction and the like in the case the camera 1 is rotated, based on information about a change in the attitude of the camera 1 detected by the acceleration/angular velocity sensor 17 or the like. A display image rotation process for displaying an image being displayed on the display panel of the display section 18 appropriately with respect to the top-bottom, left-right relationship is performed by the image processing section 11b upon reception of a determination result of the rotation determination section 30.

The face detection section 31 is an image signal processing circuit section as an object detection section for detecting whether an image corresponding to an object such as the face of a person, or a specific animal or plant (for example, a dog, a cat, a bird, or a flower) is present in an image that is displayed based on the image data which has been acquired by the image pickup device 13 and which has been outputted after image processing by the image processing section 11*b*. The face detection section 31 may perform color detection or pattern detection, for example, in addition to detecting a face image. Then, with respect to the object detected by the face detection section 31, the signal processing control section 11 performs control of maintaining focus on a followed object at all times by automatically following a moving body in the images.

The accessory communication section 32 is a circuit section for performing communication with an accessory 40 attached to the camera body 10. The signal processing control section 11 performs control of the accessory 40 through the accessory communication section 32. The accessory 40 here may be various devices to be used in conjunction with the camera 1 by being selectively attached to an accessory attaching section (a part called an accessory shoe, a hot shoe, or the like; not shown) provided on the outer surface (for example, the upper surface or the like) of the camera body 10.

To this end, a connection terminal (not shown) for being electrically connected to the accessory communication section 32 is provided to the accessory attaching section. A connection terminal to be electrically connected to an internal electrical circuit is correspondingly provided to the accessory 40. According to this configuration, when the accessory 40 is attached to the accessory attaching section, the attached accessory 40 is electrically connected to the accessory communication section 32 of the camera 1. Then, the signal processing control section 11 on the side of the camera body 10 reads unique information and the like from an information storage section 40*a* of the attached accessory 40 through the accessory communication section 32, and performs a corresponding drive control process as appropriate.

Note that, as concrete examples of the accessory 40, there are a flash device, a light source device, an electric viewfinder (EVF), a microphone connection apparatus, an external communication apparatus, and the like. As shown in FIG. 1, the accessory 40 includes, inside itself, the information storage section 40*a* storing the unique information and the like of the accessory 40. Also, although not shown in FIG. 1, unique structural units, control circuits and the like corresponding to respective apparatuses are provided inside the accessory 40. Note that each apparatus as the accessory 40 is not directly relevant to the present invention, and detailed description thereof is omitted.

The body-side communication section 12 is a signal processing circuit section for communication on the side of the camera body 10 for exchanging control signals, information signals, and the like between the camera body 10 and the lens barrel 20, by being electrically connected to a lens-side communication section 22 described below.

Now, the lens barrel 20 is configured mainly from a lens control section 21, the lens-side communication section 22, a lens-side operation section 23, a zoom drive section 24*a*, a focus drive section 24*b*, a zoom lens position detection section 25*a*, a focus lens position detection section 25*b*, a lens 26, which is an image pickup optical system, a lens-side storage section 27, and the like.

The lens control section 21 is a control section for controlling the operation of each structural unit on the side of the lens barrel 20 under the control of the signal processing control section 11 on the side of the camera body 10.

The operation section 23 collectively refers to a plurality of operation members and the like such as a focus ring for performing a switching operation at the lens side, such as switching between a normal image pickup mode and a close-up image pickup mode, operations such as an autofocus (AF) operation and a manual focus (MF) operation, and a focus adjustment operation, a zoom ring for performing a zoom operation, an electric zoom switch, and the like.

The zoom drive section 24*a* is a drive unit including a drive motor for driving a zoom optical system, of the lens 26, related to a zoom operation, a drive mechanism for transmitting the drive force, and the like. Also, the focus drive section 24*b* is a drive unit including a drive motor for driving a focusing optical system, of the lens 26, related to a focus operation, a drive mechanism for transmitting the drive force, and the like.

The zoom lens position detection section 25*a* is a position detection circuit for detecting the position of the zoom optical system on the optical axis. Moreover, the focus lens position detection section 25*b* is a position detection circuit for detecting the position of the focusing optical system on the optical axis.

The lens-side storage section 27 is a circuit section for storage including a storage medium in which various pieces of information regarding the lens barrel 20, and the like are stored in advance. The various pieces of information stored in the storage section 27 are used as appropriate and as necessary by being transferred to the side of the camera body 10 from the lens control section 21 through each of the communication sections 22 and 12. As this lens-side storage section 27, a non-volatile semiconductor memory device such as an EEPROM, a ROM (read only memory), a flash memory or the like is used.

The lens 26 includes, in addition to an image pickup optical system, configured from a plurality of optical lenses or the like, for forming an optical image of an object, a plurality of lens barrel members for holding respective optical lenses of the image pickup optical system, lens barrels for driving for separately moving each of the plurality of lens barrel members back and forth in the optical axis direction, and the like, a zoom control section 26*a* for controlling the zoom optical system which is a part of the image pickup optical system, a focus control section 26*b* for controlling the focusing optical system which is a part of the image pickup optical system, a diaphragm mechanism for adjusting the amount of a luminous flux passing through the image pickup optical system, a diaphragm control section 26*c* for driving and controlling the diaphragm mechanism, and the like. As described above, the image pickup section is configured from the lens 26 and the image pickup device 13 of the camera body 10. Note that the concrete configuration of the lens barrel 20 is assumed to be substantially the same as the configuration of a general zoom lens barrel used for a conventional camera, and detailed description and illustration thereof will be omitted. Here, as an example of the lens barrel 20, a lens barrel including a zoom lens optical system is cited, but this mode is not restrictive, and a lens barrel including a normal fixed focal length lens optical system may also be used.

The lens-side communication section 22 is a signal processing circuit section for communication on the side of the lens barrel 20 for exchanging control signals, information signals and the like between the lens barrel 20 and the camera body 10, by being electrically connected to the body-side communication section 12.

Note that the camera body 10 and the lens barrel 20 are configured by including other various structural units and the like in addition to the structural sections described above, but these various structural units and the like are structures not directly relevant to the present invention, and detailed description and illustration of the units are omitted assuming that the units have the same structures as those of a general, conventional camera.

For example, a shutter mechanism for opening/closing the optical path of the image pickup optical system, and adjusting the amount of luminous flux passing through the image pickup optical system at the time of an image pickup operation is not illustrated nor described, but the camera 1 of the present embodiment also includes a normal shutter mechanism the same as that of a conventional camera. This shutter mechanism may be a focal plane shutter arranged on the side of the camera body 10, or a lens shutter arranged on the side of the lens barrel 20. In the case the shutter mechanism is arranged on the side of the camera body 10, the shutter mechanism is controlled mainly by the control section on the body side. Also, in the case the shutter mechanism is arranged on the side of the lens barrel 20, the shutter mechanism is controlled mainly through the lens control section 21 under the control of the control section on the body side.

Figure 2:
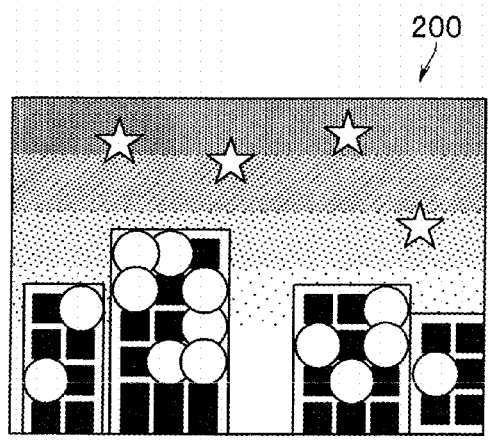
FIG. 2 is a conceptual diagram for describing image pickup of a desired object by an operator (user) using the image pickup apparatus (camera) in FIG. 1, the diagram showing a sketch of an image pickup range including a sight which is an image pick target.
Figure 3:
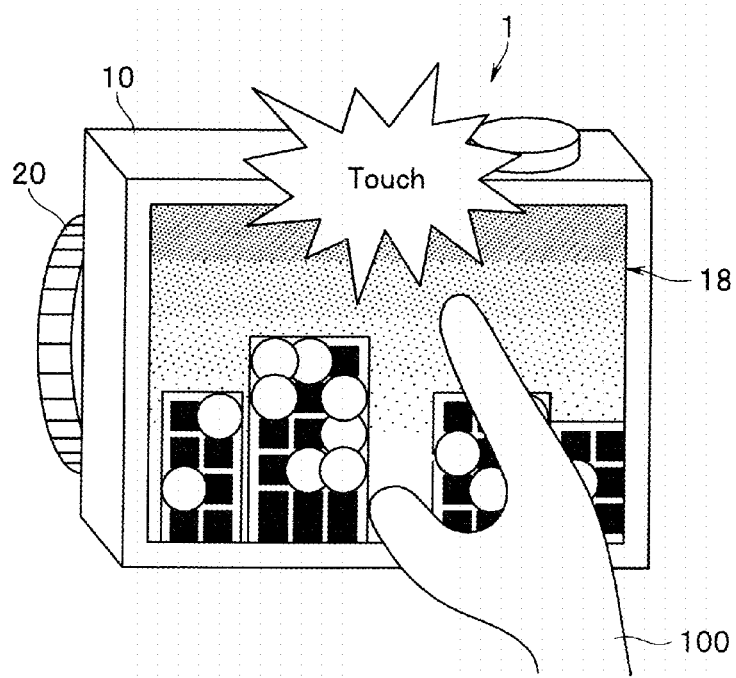
FIG. 3 is a conceptual diagram showing picking up of the image pickup target in FIG. 2 using the image pickup apparatus (camera) in FIG. 1.
Figure 4:
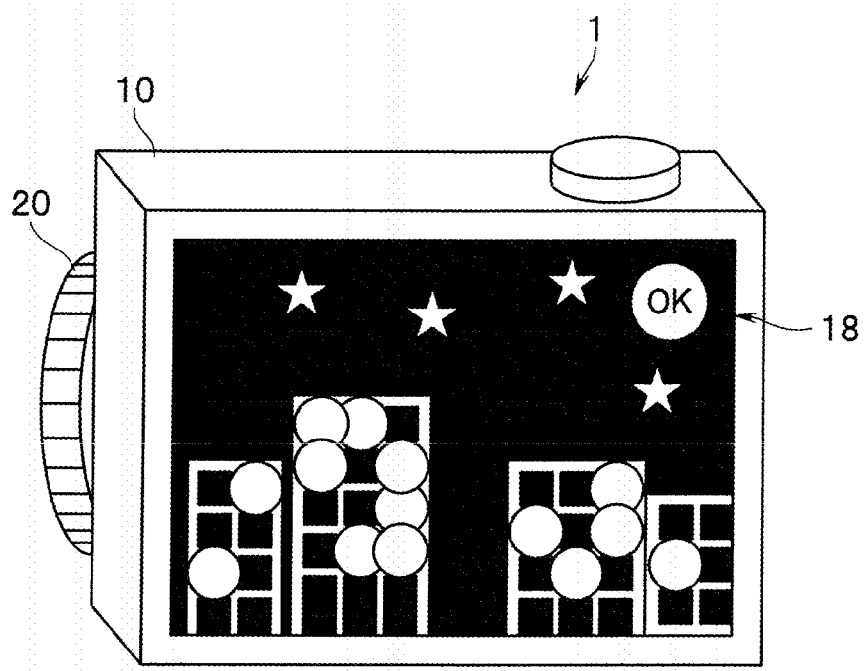
FIG. 4 is a conceptual diagram showing display of an image pickup result (image) picked up using the image pickup apparatus (camera) in FIG. 1 on a display section.

The outline of the action at the time of performing image pickup using the camera 1 of the present embodiment configured in the above manner will be described below. FIGS. 2 to 4 are conceptual diagrams showing image pickup of a desired object by an operator (user) using the camera 1 of the present embodiment. Of these drawings, FIG. 2 is a diagram showing a sketch of an image pickup range including a sight which is an image pickup target. FIG. 3 is a conceptual diagram showing picking up of the image pickup target in FIG. 2 using the camera 1 of the present embodiment. FIG. 4 is a conceptual diagram showing display of an image pick result (image) picked up using the camera 1 of the present embodiment on a display section.

In the case of taking, as the target of image pickup, an image pickup target 200 as shown in FIG. 2, for example, a scene where the surrounding environment is relatively dark, specifically, a night scene in a city including artificial light and the like, normally, the camera is fixed using a tripod or the like, and long-exposure image pickup according to which the shutter mechanism of the camera in this state is released for a predetermined period of time (so-called bulb image pickup or time image pickup) is performed. When such long-exposure image pickup is performed, the image pickup device accumulates charges according to the exposure time. An image according to the accumulated amount of charges may be thereby formed even for a dark scene, and thus, it is well known that, for example, stars in the night sky, which are objects of extremely low luminance, may be fixed as an image by performing a long exposure.

However, in an image pickup environment where, although being a dark scene, a large amount of artificial light is included, such as a night scene in a city, the artificial light may be reflected and diffused by dust in the air, clouds, or the like, resulting in the following problems. For example, the artificial light may negatively affect the entire image by causing color cast on the entire image including a region which is supposed to be dark, such as a night sky, or causing the entire picked-up image to be bright against the intention of the operator (user), or causing stars or the like emitting faint light to be erased by the artificial light and preventing the same from being displayed, or preventing accurate color reproduction. For example, FIG. 2 schematically shows the state which is actually seen by the human eye, and in this case, stars and the like are seen by the human eye in the sky region. However, if long-exposure image pickup is performed in this state, the sky region will be shown to be brighter than in reality by the accumulation of harmful light components, as shown as the display on the display section 18 in FIG. 3, and stars and the like will be erased from the display image. The present invention performs an image correction process of eliminating harmful light components such as artificial light that negatively affect a picked-up image, and acquiring an image that is closer to the way of being seen by human beings.

For this purpose, image pickup is performed by a long exposure for an image pickup target as shown in FIG. 2 by using the camera 1 of the present embodiment. Note that the camera 1 has a function that enables, even in a state where the shutter mechanism is released, checking of the accumulation state of image data being acquired by the image pickup device 13, that is, checking, using the display section 18, at a time interval set in advance, of the state of an image being picked up, namely, a live bulb function or a live time function. This function allows checking of progress of the exposure by the display on the display section 18, and is thus helpful in deciding the timing of ending the image pickup.

First, an operator (user) performs long-exposure image pickup of a desired image pickup target (see FIG. 2) using the camera 1. At this time, image pickup is started using the live bulb function or the live time function. Then, the state of the image being picked up is displayed on the display section 18 at a predetermined time interval. The operator (user) ends the exposure operation at a desired timing by looking at the image pickup state displayed on the display section 18. An end operation of the exposure operation may be a touch operation on the touch panel 18b arranged on the display screen of the display section 18, or a pressing operation of a shutter release button, for example.

In the example shown in FIG. 3, an end operation of the exposure operation is performed by the operator (user) performing a touch operation on an arbitrary position on the display screen showing the image pickup state. At the same time, the touch position at this time is made a specified position which is specified, by a hand or the like 100 of the operator (user), as a position to be a "black" region.

Figure 5:
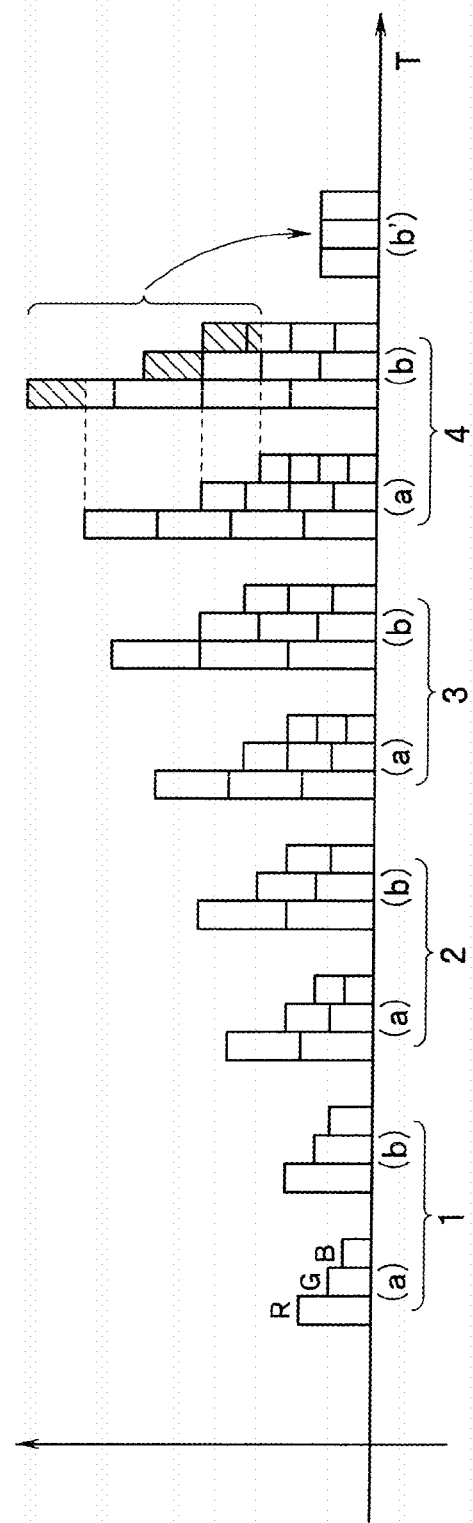
FIG. 5 is a conceptual diagram showing a change over time in the amounts of accumulated charges of RGB signals of a picked-up image picked up by using the image pickup apparatus (camera) in FIG. 1.

Now, FIG. 5 is a conceptual diagram showing a change over time in the amounts of accumulated charges of RGB signals of a picked-up image. A change over time in the amounts of accumulated charges at a specified point specified by a "black" region specification operation by the operator (user) is shown by (a) in FIG. 5, and a change over time in the amounts of accumulated charges at a pixel region of the entire image is shown by (b) in FIG. 5.

As described above, when the operator (user) performs the "black" region specification operation as shown in FIG. 3, the signal processing control section 11 of the camera 1 performs a subtraction process (correction process) for the accumulation results of the region of the entire image ((4-b) in FIG. 5) using the accumulation results of RGB signals at the specified point ((4-a) in FIG. 5). Accordingly, signals (b') from which the negative influence of the surrounding harmful light has been eliminated are kept. The image acquired by this calculation result is displayed on the display section 18 of the camera 1, as shown in FIG. 4. Here, in the case of accepting the display result on the display section 18, the operator (user) performs an operation using an operation member such as an OK button (not shown), and then, the signal processing control section 11 of the camera 1 performs an operation of storing image data based on the image being displayed.

Note that, in the example described above, the exposure end operation and the "black" region specification operation are one touch operation, but such an example operation is not restrictive. For example, when an exposure is ended by a pressing operation on the shutter release button or the like, normally, an image based on the image data acquired by the immediately preceding exposure operation is displayed immediately thereafter on the display section 18 for a predetermined period of time (a preview image). The operator (user) may perform the "black" region specification operation during the display of the preview image. Note that, although the word "black" is emphasized, not all the image data has to be cancelled, and a method of suppressing the data accumulation to a specific level may also be applied.

Also, in the description above, the camera 1 is assumed to include the live bulb function or the live time function, but these functions are not necessarily required elements. The long-exposure image pickup may be performed even if the camera 1 is not provided with the live bulb function or the live time function, and the appropriate exposure time in this case may be easily set based on the experience or a plurality of trials. The operator (user) may then perform the "black" region specification operation by a touch operation during display of a preview image after an end operation for the exposure operation. Exactly the same result as described above may be achieved by such an operation. Note that in the case of live bulb, the black at the time of touch may be maintained. Although the word "black" has been emphasized, one does not have to think that all the image data has to be cancelled, and a usage is also possible according to which the color at the time of the touch is taken as a specific level, and the data accumulation is suppressed to this level and no more accumulation is performed.

When the accumulated image signal of a specified region, which is a region including a position (for example, a "black" region specified position) on the image identified by the touch determination section 11c (position identification section), is subtracted from the accumulation results of the entire image, there is a case where the value obtained by the subtraction becomes negative.

Therefore, a limiter may be used in the subtraction process. For example, instead of subtracting the accumulated image signal of the specified region, which is the region including the position (for example, the "black" region specified position) on the image identified by the touch determination section 11c (position identification section), from the accumulation results of the entire image, only a specific ratio of the accumulated image signal of the specified region, for example, a half value of the accumulated image signal of the specified region, may be subtracted from the accumulation results of the entire image. That is, the value to be subtracted in the subtraction process may be set to a predetermined value according to the accumulated image signal of the specified region (for example, the "black" region), which is the region including the position on the image identified by the touch determination section 11c (position identification section).

Figure 6:
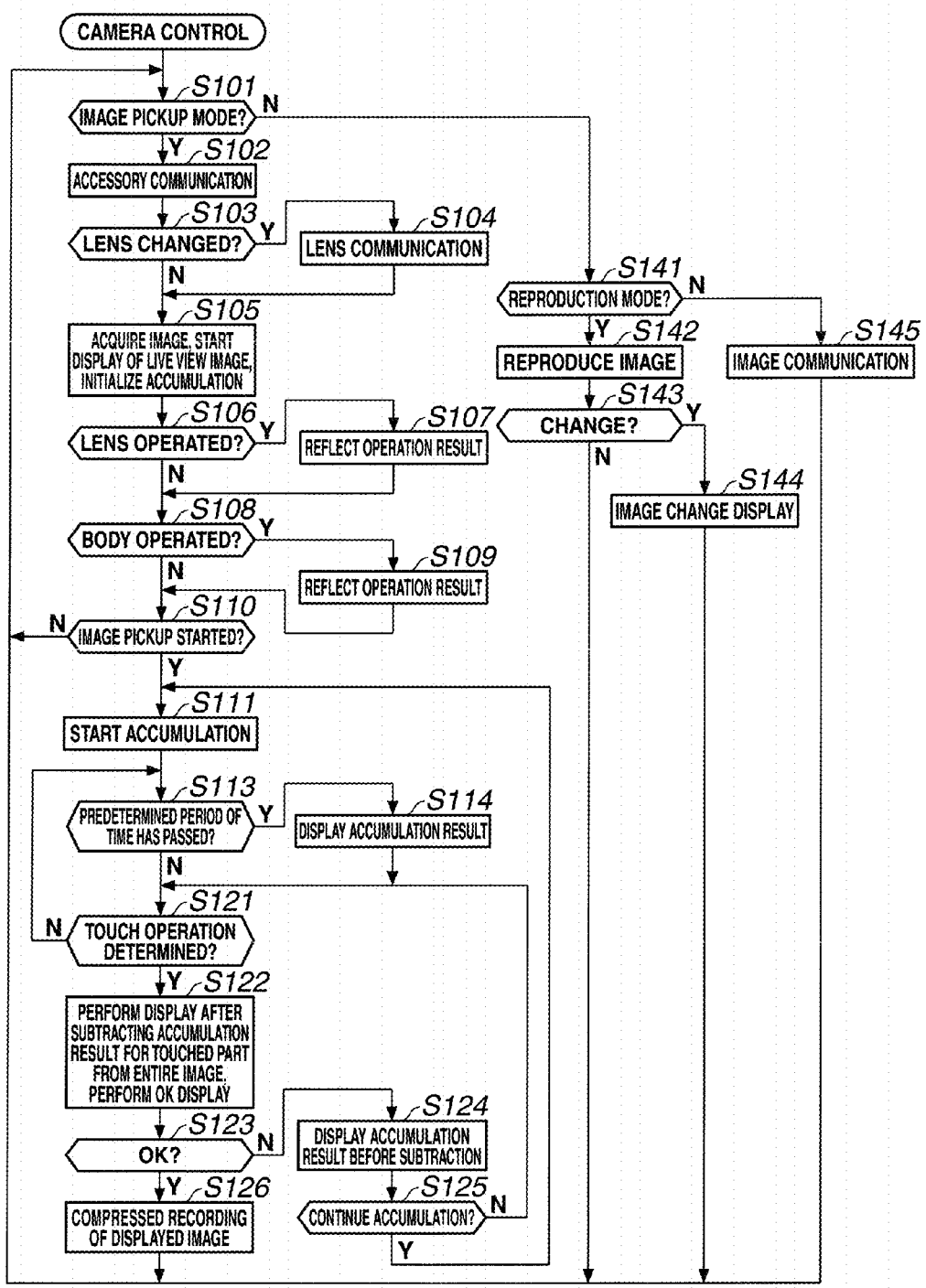
FIG. 6 is a flowchart showing an example of a process sequence of the image pickup apparatus (camera) in FIG. 1 (long-exposure image pickup)

Next, the action of the camera 1 of the present embodiment described above will be described below using the flowchart of FIG. 6. FIG. 6 is a flowchart showing an example of the process sequence of the camera of the present embodiment (long-exposure image pickup).

First, it is assumed that the camera 1 of the present embodiment is active and usable with the power being on. In this state, in step S101, the signal processing control section 11 checks whether or not the operation mode that is currently set is an image pickup mode. In the case it is confirmed here that the image pickup mode is set, the process proceeds to the next step S102. Also, in the case it is confirmed that other than the image pickup mode is set, the process proceeds to step S141.

In step S102, the signal processing control section 11 controls the accessory communication section 32, and performs an accessory communication process. This accessory communication process is a process of checking whether or not the accessory 40 is attached to the camera 1, and in the case the accessory 40 is attached, a process of checking the type and the like of the attached accessory 40 (a process of acquiring unique information, and the like), and a process of starting the control, for example. The specific process is not directly relevant to the present invention, and detailed description thereof is omitted.

Next, in step S103, the signal processing control section 11 controls the body-side communication section 12, and checks whether or not the lens barrel 20 is attached to the camera body 10, or checks whether or not a lens change operation has been performed. In the case it is confirmed that the lens barrel 20 is attached to the camera body 10, and that the lens change operation is not performed, the process proceeds to the next step S105. Also, in the case that the lens change operation has been performed is confirmed, the process proceeds to step S104.

Note that, in the case it is confirmed in the process in step S103 described above that the lens barrel 20 is not attached to the camera body 10, the signal processing control section 11 controls the display section 18 to display an alarm to that effect or the like, to urge the operator (user) to attach the lens barrel 20. Then, after confirming the attachment of the lens, a lens communication process in the next step S104 is performed.

In step S104, the signal processing control section 11 performs the lens communication process with the lens control section 21 of the lens barrel 20 through the body-side communication section 12 and the lens-side communication section 22. In this lens communication process, acquisition of information about the type or the like of the lens barrel 20 that is attached is performed, for example. Then, the process proceeds to step S105.

In step S105, the signal processing control section 11 controls the image pickup section including the image pickup device 13, the lens 26, and the like, the display section 18, and the like, and performs an image data acquisition process and a live view image display process. At the same time, the signal processing control section 11 performs a process of initializing the accumulation section 11a. Then, the process proceeds to step S106.

In step S106, the signal processing control section 11 monitors a signal from the lens control section 21 through the communication sections 12 and 22, and checks whether or not an operation instruction signal to be generated by operation of the lens-side operation section 23 is generated, that is, whether or not an operation of the lens barrel 20, such as a zoom operation, a focus adjustment operation, or the like, is performed. In the case some kind of lens operation is confirmed, the process proceeds to step S107. Also, in the case no lens operation is confirmed, the process proceeds to step S108.

In step S107, the signal processing control section 11 performs a predetermined process of reflecting the result of the lens operation which has been confirmed, such as a zoom operation or a focus adjustment operation. Then, the process proceeds to step S108.

In step S108, the signal processing control section 11 monitors an instruction signal from the operation section 15 on the side of the camera body 10, and checks whether or not an operation of the camera body 10, such as a menu operation or a mode switching operation, is performed. In the case some kind of body operation is confirmed here, the process proceeds to step S109. Also, in the case no body operation is confirmed, the process proceeds to step S110.

In step S109, the signal processing control section 11 performs a predetermined process of reflecting the result of the body operation which has been confirmed, such as menu display and various related setting change operations, a mode switching operation, or the like. Then, the process proceeds to step S110.

In step S110, the signal processing control section 11 monitors an instruction signal from the operation section 15, the touch panel 18b, or the like, and checks whether or not an instruction signal for starting an image pickup operation has been issued. An instruction signal for starting an image pickup operation is an instruction signal from the shutter release button included in the operation section 15, or an instruction signal from the touch panel 18b, for example. In the case an instruction for image pickup start is confirmed here, the process proceeds to step S111. Also, in the case an instruction for image pickup start is not confirmed, the process returns to step S101 described above.

In step S111, the signal processing control section 11 receives an output from the image pickup device 13, and starts a charge accumulation process by the accumulation section 11a.

Next, in step S113, the signal processing control section 11 monitors the clock section 19, and checks whether or not a predetermined period of time has passed from the start of image pickup. In the case passing of a predetermined period of time is confirmed here, the process proceeds to step S114. Also, in the case passing of a predetermined period of time is not confirmed, the process proceeds to step S121.

In step S114, the signal processing control section 11 controls the accumulation section 11a, the image processing section 11b, the display control section 11d, and the like, generates an image signal for display based on image data which has been accumulated, and displays a halfway image using the display section 18. Then, the process proceeds to step S121. By repeating this process, the image pickup state may be checked on the display section 18 by the present camera 1 at a specific time interval during the bulb image pickup or the time image pickup.

In step S121, the signal processing control section 11 monitors an instruction signal from the touch panel 18b, and checks whether or not a touch operation has been performed and, in the case a touch operation has been performed, performs touch position identification by the touch determination section 11c. Here, in the case no touch operation is confirmed, the process returns to step S113 described above, and the process is repeated thereafter. Also, in the case a touch operation is confirmed, touch position identification is performed, and then the process proceeds to the next step S122.

In step S122, the signal processing control section 11 controls the accumulation section 11a, the image processing section 11b, the display control section 11d, and the like, performs a correction calculation process of subtracting the result of charge accumulation corresponding to the touch position confirmed and determined in the process in step S121 described above from the result of charge accumulation of the entire image, and also, performs a process of causing the display section 18 to display an image based on the processing result. Here, the image correction process mentioned above is performed by the image processing section 11b functioning as a correction section. Furthermore, display of an "OK" icon or the like in a predetermined region of the display section 18 is performed. Icon data or the like stored in advance in the storage section 14 or the temporary storage section 16, for example, is used for the "OK" icon or the like. The operator (user) notifies the camera 1 of the acceptability of the image that is currently displayed on the display section 18 (the image reflecting the result of the subtraction process described above) by performing a touch operation on the portion corresponding to the "OK" icon display. The acceptability of an image here is confirmation regarding whether or not the image is to be stored. Note that an operation member such as an "OK" button (not shown) included in the operation section 15 of the camera body 10 may be operated instead of the touch operation on the "OK" icon display.

In step S123, the signal processing control section 11 monitors an instruction signal from the touch panel 18b, the operation section 15, or the like, and performs a check regarding an instruction signal corresponding to the "OK" icon display. Here, in the case an "OK" instruction is confirmed, the process proceeds to the next step S126. Also, in the case the "OK" instruction is not confirmed, the process proceeds to step S124.

In step S124, the signal processing control section 11 controls the accumulation section 11a, the image processing section 11b, the display control section 11d, and the like, and performs a process of displaying the result of accumulation prior to the subtraction process of the process in step S122 described above. Then, the process proceeds to step S125.

In step S125, the signal processing control section 11 checks whether or not the charge accumulation operation by the accumulation section 11a is to be continued, that is, whether or not the bulb image pickup or the time image pickup is to be continued. Here, in the case of continuing the charge accumulation operation (image pickup), the process returns to step S111 described above, and the process is repeated thereafter. Also, in the case of not continuing the charge accumulation operation (image pickup), the process returns to step S121 described above, and the process is repeated thereafter.

On the other hand, in the case an "OK" instruction is confirmed in the process in step S123 described above, and the process proceeds to step S126, the signal processing control section 11 performs, in this step S126, a compression storage process for the image that is currently displayed on the display section 18, that is, image data corresponding to the image on which the subtraction process has been performed (temporarily stored in the temporary storage section 16). Then, the process returns to step S101.

On the other hand, in the case the operation mode set in the camera 1 is confirmed in the process in step S101 described above to be other than the image pickup mode, and the process proceeds to step S141, the signal processing control section 11 checks, in this step S141, whether or not the operation mode that is currently set is a reproduction mode. In the case setting of the reproduction mode is confirmed here, transition to a predetermined reproduction process sequence takes place, and the process proceeds to step S142.

In step S142, the signal processing control section 11 controls the storage section 14 and reads latest image data among pieces of image data stored in the storage medium, and after performing predetermined signal processing, controls the display section 18 and performs an image reproduction process.

Next, in step S143, the signal processing control section 11 monitors an instruction signal from the operation section 15 or the touch panel 18b, and checks whether or not an instruction for change of the display image has been issued.

In the case it is confirmed here that an instruction for change of the display image has been issued, the process proceeds to the next step S144. Also, in the case an instruction for change of the display image is not confirmed, the process returns to step S101 described above, and the process is repeated thereafter. Note that the reproduction process sequence of the camera 1 of the present embodiment is the same as that of a general, conventional camera.

On the other hand, in the case setting of other than the reproduction mode is confirmed by the process in step S141 described above, transition to the process sequence of another operation mode such as an image communication mode takes place. Note that other operation modes including the image communication mode are not directly relevant to the present invention, and detailed description thereof is omitted. Then, the process returns to step S101, and the process is repeated thereafter.

Note that the signal processing control section 11 of the camera 1 of the present embodiment monitors instruction signals from the operation section 15, the touch panel 18b, or the like at all times. Then, in the case an instruction signal from the operation section 15, the touch panel 18b, or the like is confirmed at any point during the process sequence described above, interruption for a process corresponding to the instruction signal which has been confirmed is performed. Accordingly, regardless of the operation state of the camera 1, in the case a predetermined interrupt signal (for example, a power off signal, a rest signal, or an operation switching signal) is confirmed, a process according to the interrupt instruction (for example, a power off process, a reset process, or an operation switching process) is performed after the process currently under way is suspended, or after the process currently under way is completed.

Next, assuming an image pickup state (FIG. 2) different from the example described above, the action at the time of image pickup using the camera 1 of the present embodiment will be described below. With respect to the image pickup state described below, the example of the image pickup state described above describes a state where a scene whose surrounding environment is relatively dark and artificial light or the like is included, such as a night scene in a city, is taken as the image pickup target. The example of the image pickup state described below assumes a state where, in the state similar to that of the example of the image pickup state described above, a person or the like as a main object is further present at a distance relatively close to the camera 1 (for example, about five meters or less from the position of the camera 1).

Figure 7:
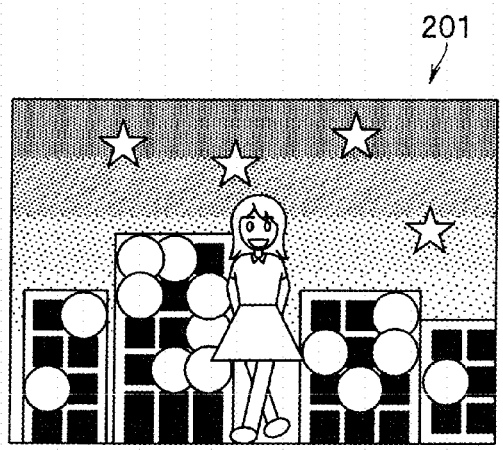
FIG. 7 is a conceptual diagram for describing image pickup of a desired object by an operator (user) under another image pickup state using the image pickup apparatus (camera) in FIG. 1, the diagram showing a sketch of an image pickup range including a sight and a main object (person) as image pickup targets (predicted acquired image)
Figure 8:
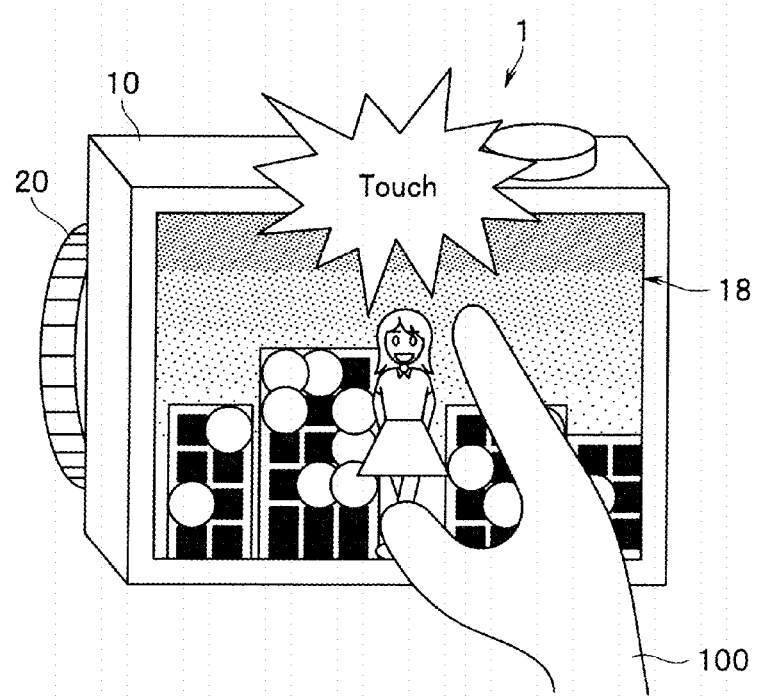
FIG. 8 is a conceptual diagram showing picking up of the image pickup targets in FIG. 7 using the image pickup apparatus (camera) in FIG. 1.
Figure 9:
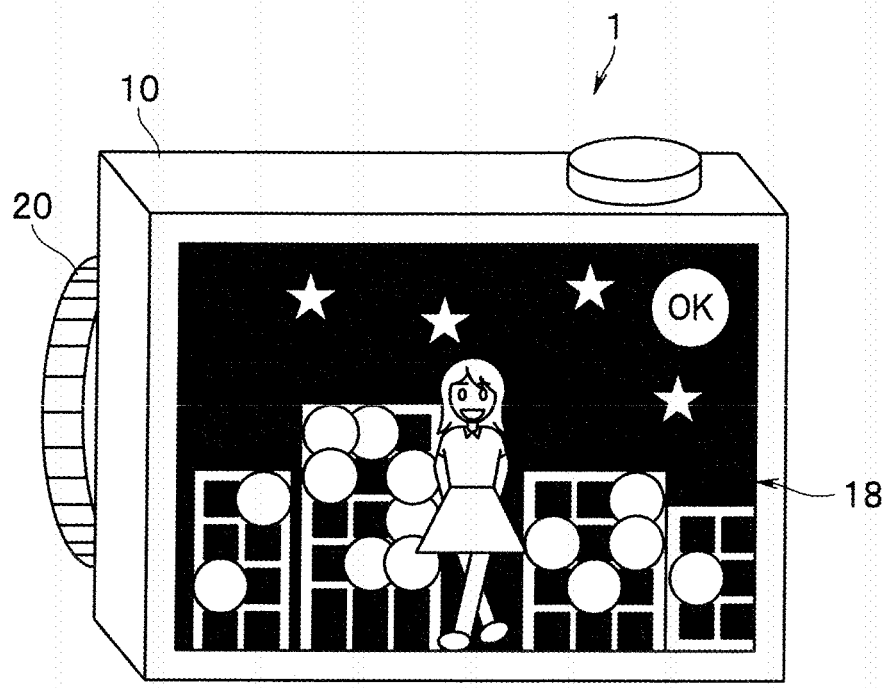
FIG. 9 is a conceptual diagram showing display, on a display section, of an image pick result (image) picked up using the image pickup apparatus (camera) in FIG. 1.

FIGS. 7 to 9 are conceptual diagrams for describing image pickup, in another image pickup state, of a desired object by an operator (user) using the camera 1 of the present embodiment. Of these drawings, FIG. 7 is a diagram showing a sketch of an image pickup range including a sight and a main object (person) as image pickup targets (predicted acquired image). FIG. 8 is a conceptual diagram showing picking up of the image pickup targets in FIG. 7 using the camera 1 of the present embodiment. FIG. 9 is a conceptual diagram showing display, on the display section, of an image pick result (image) picked up using the camera 1.

In the image pickup state shown in FIG. 7, a person as the main object is added to the image pickup target 200, which is in the state of FIG. 2 described with reference to the example above, to obtain an image pickup target 201. With respect to image pickup in this state, control of causing a flash device (accessory 40) to emit light at a predetermined timing, such as immediately after the start of image pickup, or during or immediately before the end of a long exposure (so-called slow synchronization image pickup), is performed in addition to the long-exposure image pickup. Accordingly, the main object (person) at a close distance may be captured clearly and brightly by using the flash device, and at the same time, the background (dark scene) may be captured brightly by the long-exposure image pickup. In this case, the main object (person) may move after the flashing of the flash device. According to the camera 1 of the present embodiment, a natural night scene image may be acquired also in such an image pickup state by performing an image correction process of removing the harmful light components in the sky region or the like.

That is, as in the example described above (FIG. 3), when the operator (user) performs the "black" region specification operation by a touch operation by using the hand or the like 100, as shown in FIG. 8, the signal processing control section 11 of the camera 1 performs a subtraction process for the accumulation results of the region of the entire image using the accumulation results of RGB signals at the specified point, and may thereby eliminate the negative influence of the surrounding harmful light. The image that is acquired as a result of this calculation is displayed on the display section 18 of the camera 1, as shown in FIG. 9. Note that, although the word "black" is emphasized, not all the image data has to be cancelled, and a method of suppressing the data accumulation to a specific level may also be applied. This is because a small amount of harmful light may sometimes create a nice atmosphere. For example, an application method according to which the level of a touched portion is assumed to be "black" is also possible.

Figure 10:
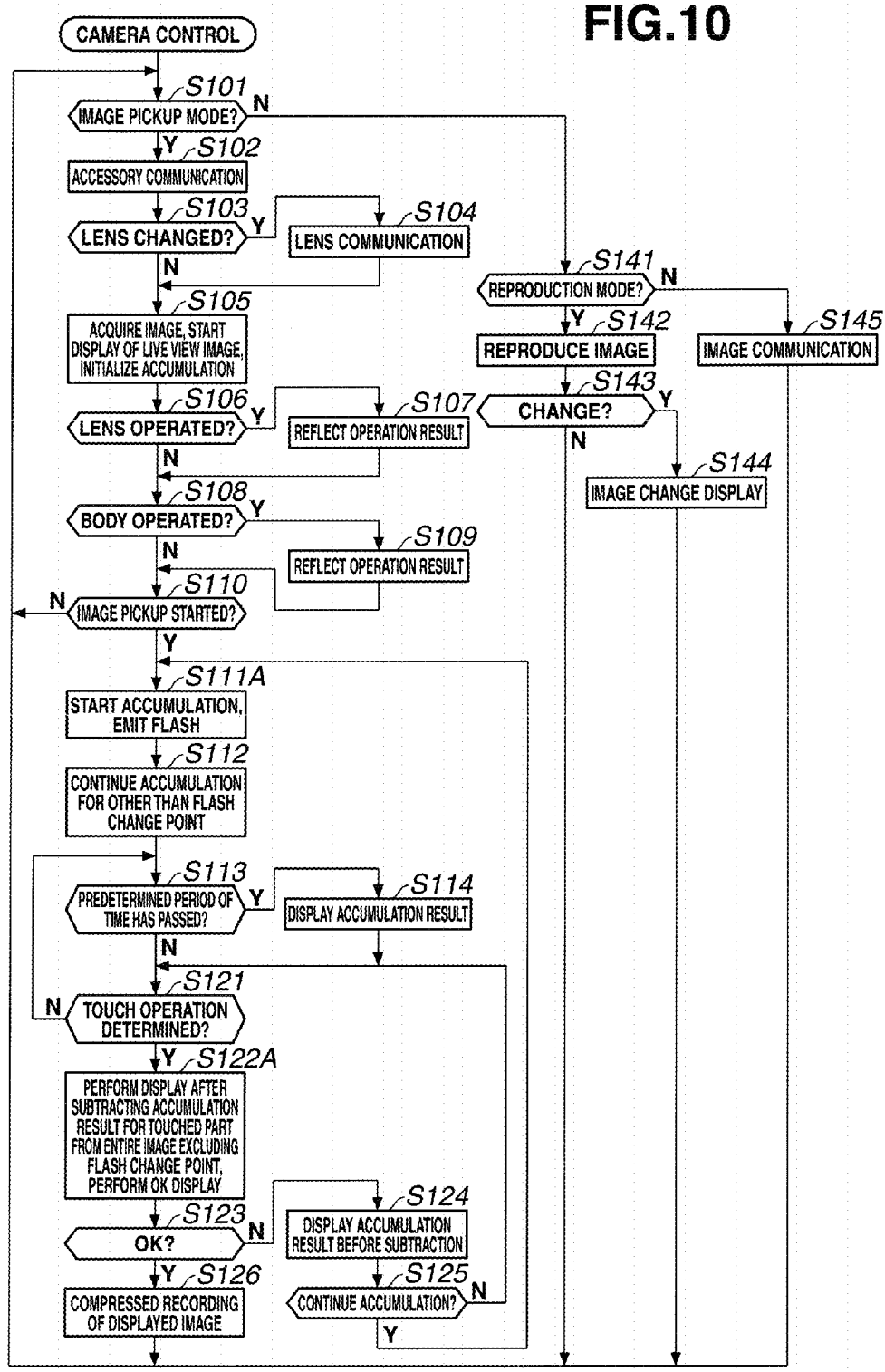
FIG. 10 is a flowchart showing another example of the process sequence of the image pickup apparatus (camera) in FIG. 1 (slow synchronization image pickup)

The action of the camera 1 in this case will be described below with reference to the flowchart in FIG. 10. FIG. 10 is a flowchart showing another example of the process sequence of the camera of the present embodiment (slow synchronization image pickup). Note that the flowchart in FIG. 10 is substantially the same as the flowchart in FIG. 6, with only some of the processing steps being different. Accordingly, in the following description, only the different processing steps will be described in detail, and the same processing steps will be denoted by the same step numbers, and description thereof will be omitted.

First, the camera 1 of the present embodiment is assumed to be active and usable with the power being on. In this state, the signal processing control section 11 checks, in step S101, whether or not the operation mode that is currently set is the image pickup mode. Each of the processes from step S101 to S110 below is exactly the same as that in the flowchart in FIG. 6 described above.

When an image pickup operation is started in step S110, the signal processing control section 11 receives, in the next step S111A, an output from the image pickup device 13, and starts a charge accumulation process by the accumulation section 11a. At the same time, the signal processing control section 11 controls the flash device as the accessory 40 attached to the camera body 10, through the accessory communication section 32, and performs a flash operation according to the distance to the main object. Control of the flash operation itself is normal flash control performed by a general, conventional camera.

Next, in step S112, the signal processing control section 11 continues the charge accumulation process by the accumulation section 11a. The charge accumulation process in this case is mainly performed for regions other than a flash change point. The flash change point is a point (image region) where a clear change is made in an image region as a result of flashing performed in step S111A described above. That is, by performing the flashing described above, the main object (a person or the like in the present example) present at a close distance is brightly captured. The region is taken as the flash change point. Determination regarding the flash change point is performed in the following manner. That is, the amount of accumulated charges for a predetermined period of time where flashing is performed and the amount of accumulated charges for a predetermined period of time where the flashing is not performed are compared, and if the former is greater, it is determined as the flash change point. Then, the process proceeds to step S113. Each of the processes in steps S113, S114 and S121 below is exactly the same as that in the flowchart in FIG. 6 described above.

In the case a touch operation is confirmed and the touch position is determined in the process in step S121, and the process proceeds to the next step S122A, the signal processing control section 11 controls, in this step S122A, the accumulation section 11a, the image processing section 11b, the display control section 11d, and the like, and performs a process of subtracting the result of charge accumulation corresponding to the touch position confirmed and determined in the process in step S121 described above from the result of charge accumulation of the region of the entire image other than the flash change point, and also, performs a process of causing the display section 18 to display an image based on the processing result. Furthermore, an "OK" icon or the like is displayed in a predetermined region on the display section 18. Then, the process proceeds to step S123. Each of the processes from step S123 to S126 below is exactly the same as that in the flowchart in FIG. 6 described above.

Note that each of the processes from step S141 to S145 performed in the case the operation mode set in the camera 1 is confirmed to be other than the image pickup mode in the process in step S101 described above and the process proceeds to step S141 is exactly the same as that in the flowchart in FIG. 6 described above.

As described above, according to the embodiment described above, at the time of image pickup by a long exposure, the image pickup device 13 accumulates charges according to the exposure time. In this case, the accumulation process is performed separately for each of the RGB signals. Then, when the operator (user) specifies a position to be the "black" region by performing a touch operation on an arbitrary position in the display screen while observing the image pickup state, the camera 1 eliminates, in response, the negative influence from the harmful light with respect to the region including the "black" region specified position mentioned above, and thus, image pickup for starlit sky or a dark place may be easily performed by a simple configuration.

Note that in the embodiment described above, a process of subtraction from R, G, and B values is performed to sharpen the way the image in the black region looks, but this means is not restrictive. For example, as another embodiment, to make a point which is touched black, only the luminance value of the touch point is changed. In this case, the color space of the image region at the touch point, for example, R, G and B signals, is converted into Y (luminance signal), and Cb and Cr (color-difference signals), and the subtraction process with respect to the result of charge accumulation is performed only for the Y (luminance signal). Then, the color space conversion is performed again to regain R, G, and B. Also, although the word "black" is emphasized, not all the image data has to be cancelled, and a method of suppressing the data accumulation to a specific level and taking the level as black may also be applied. In this case, subtraction with respect to the R, G, and B values are performed to achieve the level.

Figures 11A, 11B:
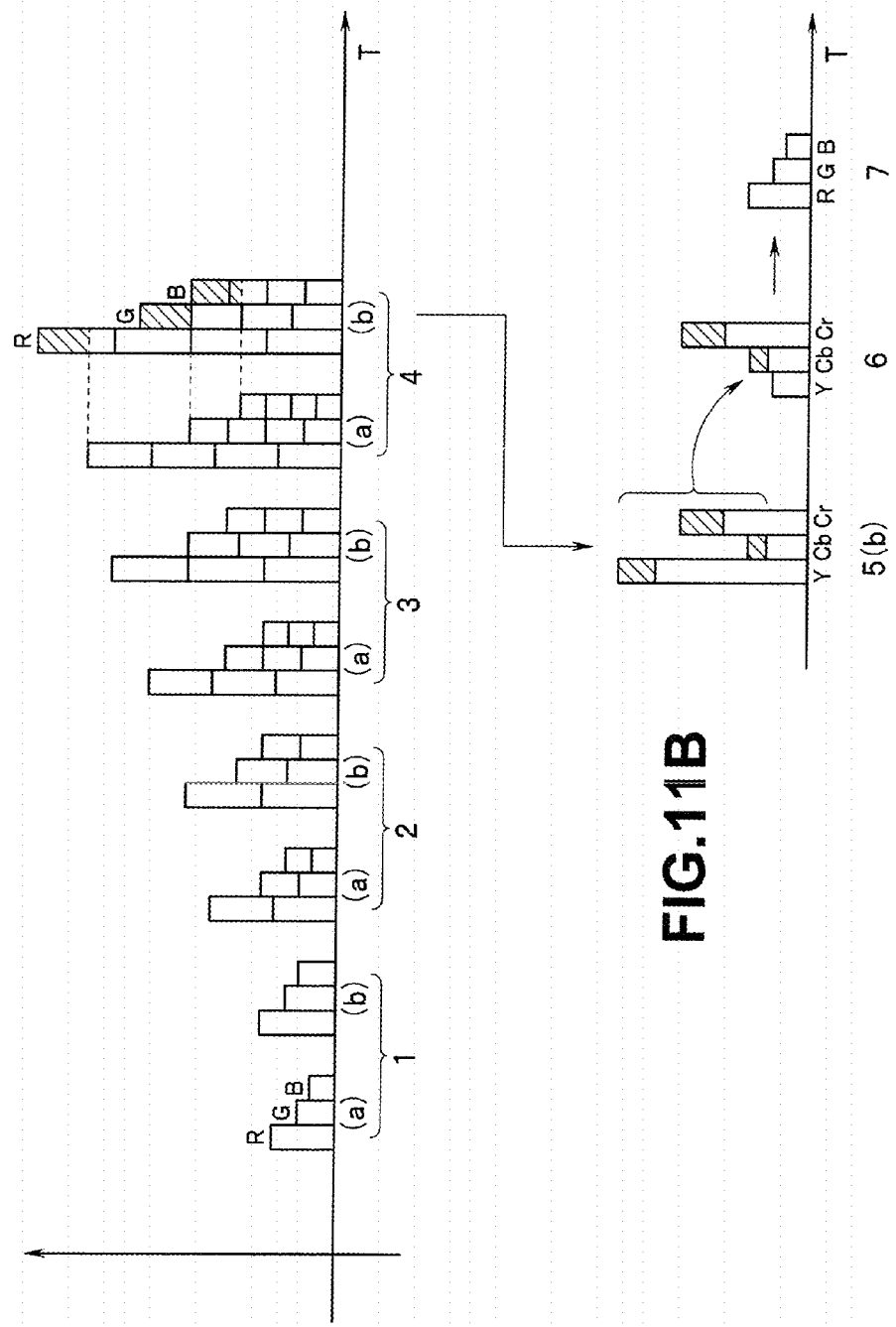
FIG. 11A is a diagram for describing another embodiment of the present invention, and is a conceptual diagram showing a change over time in the amounts of accumulated charges of RGB signals of a picked-up image picked up by using the image pickup apparatus (camera) in FIG. 1.
FIG. 11B is a conceptual diagram of the amounts of accumulated charges after performance of color space conversion from the state in FIG. 11A.

As in the embodiment described above, for example, long-exposure image pickup is performed with respect to a desired image pickup target (see FIG. 2) by using the camera 1. The image pickup device 13 then starts accumulation of the amount of charges. The operator (user) performs a touch operation on an arbitrary region on the display screen of the display section 18 during the execution of the long-exposure image pickup. The touch position at this time is the position specified by the operator (user) as the "black" region. FIG. 11A shows, as in FIG. 5 of the embodiment described above, a conceptual diagram showing a change over time in the amounts of accumulated charges of RGB signals of a picked-up image. Here, a change over time in the amounts of accumulated charges at a specified point specified by a "black" region specification operation by the operator (user) is shown by (a) in FIG. 11A, and a change over time in the amounts of accumulated charges at a region of the entire image is shown by (b) in FIG. 11A (same as in FIG. 5). FIG. 11B is a diagram showing the concept of the amounts of accumulated charges after performance of color space conversion from the state in FIG. 11A.

In the embodiment described above, the signal processing control section 11 of the camera 1 performs, using the accumulation results of RGB signals at a specified point at the time of the "black" region specification operation ((4-a) in FIG. 5), the subtraction process (correction process) for the accumulation results of the region of the entire image at the same time point ((4-b) in FIG. 5). Thus, a process of acquiring an image from which harmful light has been removed by obtaining signals (b') from which the negative influence of the surrounding harmful light has been removed is performed.

On the other hand, in the present embodiment, the signal processing control section 11 of the camera 1 performs conversion into Y, Cb, and Cr signals from the R, G, and B signals of the accumulation results of RGB signals at a specified point at the time of the "black" region specification operation ((4-a) in FIG. 11A) and the accumulation results of the region of the entire image at the same time point ((4-b) in FIG. 11A) (see (5-b) in FIG. 11B). The difference value signals (shaded regions in 5(b) in FIG. 11B) between the accumulation results of the "black" region specified point and the accumulation results of the region of the entire image are calculated based on these Y, Cb, and Cr signals (see 6 in FIG. 11B). The subtraction process performed at this time is performed only for Y (luminance signal), for example. Then, color space conversion is performed again, and R, G, and B signals are regained (see 7 in FIG. 11B).

Also in this embodiment, the same result as in the embodiment described above may be obtained. Moreover, in the case of this means, since the subtraction process is performed only with respect to the luminance signal Y, color signals are not affected, and a correction process of reducing the brightness without losing the color balance in the image may be performed.

Figure 12:
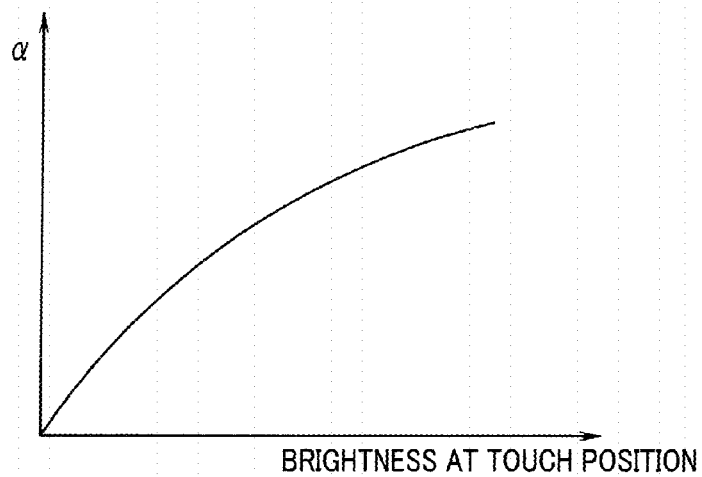
FIG. 12 is a graph showing, for the other embodiment shown in FIGS. 11A and 11B, an example of a relation of a correction factor α to the brightness at a touch position.

Also, the following point may be taken into account with respect to the degree of brightness correction process for a point specified by the operator (user) by a touch operation. For example, a factor $\alpha$ according to the brightness at a touch point is determined. This factor $\alpha$ is set to be a greater value as the brightness is increased, as shown in FIG. 12, for example. Here, FIG. 12 is a graph showing an example of a relation of the correction factor $\alpha$ to the brightness at a touch position.

Figure 13:
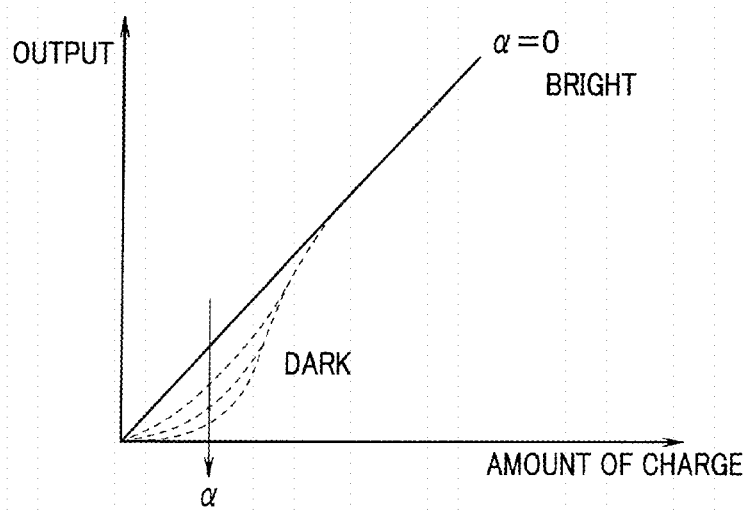
FIG. 13 is a graph showing, for the other embodiment shown in FIGS. 11A and 11B, an example of a relationship between an amount of accumulated charges and an output (gamma table)

Then, a gamma table (tone correction table) or the like according to which a dark portion is more suppressed as the correction factor α is greater is prepared, and the brightness (luminance) correction process may be performed using this table. For example, FIG. 13 is a graph showing an example of a relationship between an amount of accumulated charges and an output (gamma table). Here, the solid straight line in FIG. 13 shows the amount of accumulated charges before correction. When a correction process is performed on this straight line using the correction factor α, correction (table conversion) is performed such that the output is suppressed more for a region closer to a dark portion. In this case, the correction process may be performed for the RGB signals, or may be performed only for the Y signal after conversion into Y, Cb, and Cr signals.

When such a correction process is performed, the color balance may be maintained, and the brightness at a region which was nearly made unnaturally bright due to the influence of harmful light or the like may be suppressed, and a more natural image may be obtained, compared to a case of performing a luminance subtraction process or the like uniformly on the entire image.

On the other hand, the following point may be taken into account regarding the degree of range of a region on which the luminance correction process is to be performed, with respect to a point specified by the operator (user) by a touch operation.

For example, a touch specified point (a region where the luminance correction is desired to be performed; specifically, the region of the sky or the like) and another region (the region of stars, buildings, or the like) are distinguished from each other, and the luminance correction process is desirably performed only for the former (the region of the sky or the like).

To this end, a region with a small luminance difference, compared to a region including the touch specified point, that is, a region where the luminance changes smoothly (gradation region) is determined to be the region of the sky or the like, and a region with a great luminance difference, that is, a region where the luminance changes drastically (for example, a part of artificial light such as neon lights, or a bright part, in the gradation region such as the sky, such as a star) is determined to be another region. In this manner, determination may be performed regarding whether a region in an image is a sky region or another region, and the luminance correction process may be performed with respect to the region of the sky or the like including the touch specified point.

Figure 14:
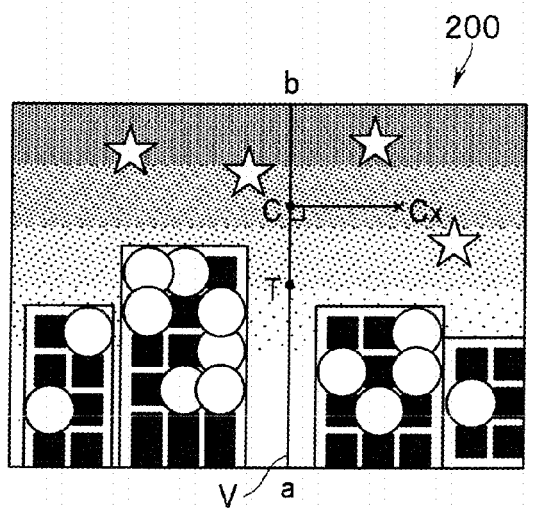
FIG. 14 is a diagram for describing another embodiment of the present invention, and is a diagram showing a sketch of an image pickup range, including a sight as an image pickup target, of image pickup by the image pickup apparatus (camera)

On the other hand, as another embodiment of the image correction process for a result of charge accumulation, the following example is conceivable. As shown in FIG. 14 (conceptual diagram of an image pickup target, like FIG. 3), for example, with respect to a night scene in a city or the like, normally, in many cases, gradual gradation takes place along a vertical line V running from the horizontal line along the vertical direction through a touch specified point T, that is, a vertical line ab, in FIG. 14, in the screen connecting a point a and a point b through the touch point T (a case where artificial light or the like is not present on the straight line ab). Thus, brightness correction may be performed according to a position, in the screen, in the height direction, that is, a position on the vertical line ab.

Here, the vertical direction (height direction) of the screen may be defined by defining the straight line ab in FIG. 14 by using a function allowing detection of the attitude of the camera 1 based on the output of a well-known electronic level, such as the acceleration/angular velocity sensor 17, provided inside the camera 1. Also, the coordinates of the touch specified point (reference sign T in FIG. 14) in the screen may be determined by the touch panel 18b.

Then, a correction factor regarding a gradational change at a position along the vertical direction of the screen (position on the straight line ab) is set, and the correction process for the touch specified point T is performed using the correction factor. In this case, the correction factor may be obtained in the following manner.

Figure 15:
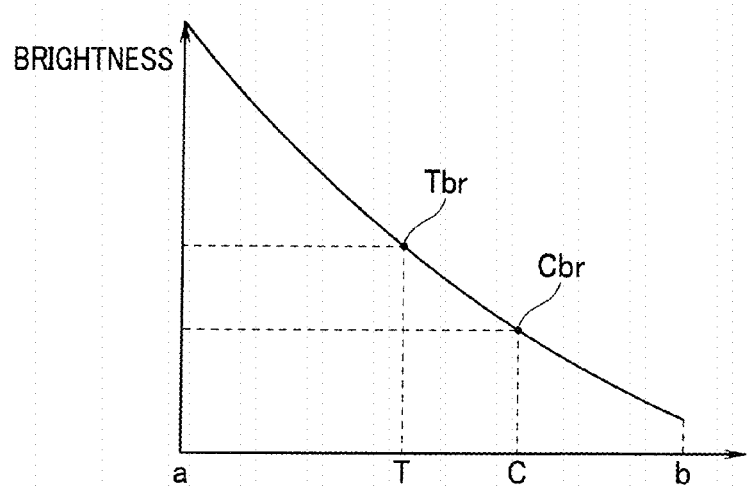
FIG. 15 is a conceptual diagram showing an example of a gradational change along a straight line ab (vertical line V including a touch point T) in FIG. 14.

FIG. 15 is a conceptual diagram showing an example of a gradational change along the straight line ab (vertical line V including the touch point T) in FIG. 14. In FIG. 15, the vertical axis is the brightness, and the horizontal axis is the straight line ab. Here, a gradational change of gradual reduction in the brightness takes place along the straight line ab, gradually from the point a to the point b.

In this case, the brightness at the touch point T on the straight line ab is indicated by the reference sign Tbr in FIG. 15, for example. Also, the brightness at an arbitrary point indicated by the reference sign Cx in FIG. 14 is obtained in the following manner. When a perpendicular line is drawn from a coordinate point of the reference sign Cx in FIG. 14 toward the straight line ab, a point indicated by the reference sign C in FIG. 14 is obtained. Here, with respect to the example of the image pickup target shown in FIG. 14, the gradational change in the sky region on the screen is assumed to correspond to a change along the straight line ab, and thus, the brightness at the arbitrary point Cx on the screen may be assumed to be substantially the same as the brightness at the point C on the straight line ab. Accordingly, the brightness at the point C on the straight line ab may be obtained as the reference sign Cbr shown in FIG. 15.

Figure 16:
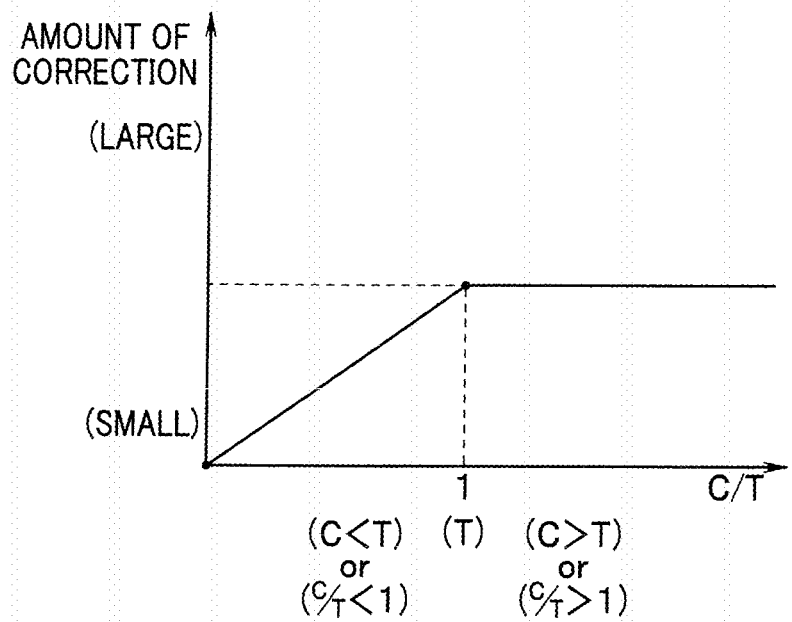
FIG. 16 is a graph showing, for the embodiment of FIG. 14, an example of a relationship between a ratio (C/T) between the brightness at the touch point T and the brightness at a point C and the amount of correction.

Then, the ratio (C/T) between the brightness at the touch point T and the brightness at the point C is obtained. FIG. 16 is a graph showing an example of a relationship between the ratio (C/T) between the brightness at the touch point T and the brightness at the point C and the amount of correction.

As shown in FIG. 16, in the case the brightness ratio between the touch point T and the point C (C/T) is 1, the positions of the touch point T and the point C may be assumed to be substantially the same (C=T). The touch point T here is a region desired by the operator (user) to be black, and thus, the amount of correction for the touch point T is set to the maximum. As for the correction process at this time, the correction process of the embodiment described above, or of other examples may be performed.

On the other hand, in the case the brightness at the point C is less than that at the touch point T ((C<T) or (C/T<1)), the position of the point C is assumed to be on the upper side in the screen than the touch point T (mainly, the region of the sky or the like). Accordingly, the actual brightness tends to be reduced as it gets closer to the upper side of the screen from the touch point T. Thus, in the region on the upper side of the screen than the position of C=T, correction is performed such that the darkness is gradually increased from the touch point T toward the point b at the upper edge of the screen. That is, as shown in FIG. 16, setting is performed in such a way that the amount of correction is gradually reduced from the touch point T toward the point b.

On the other hand, in the case the brightness at the point C is greater than that at the touch point T ((C>T) or (C/T>1)), the position of the point C is more to the lower side of the screen than the touch point T. Accordingly, the actual brightness tends to be increased as it gets closer to the lower side of the screen from the touch point T. Thus, in the region on the lower side of the screen than the position of C=T, setting is performed in such a way that the amount of correction is the same for the region from the touch point T to the point a as for the touch point T, as shown in FIG. 16.

According to this embodiment, the amount of correction is set according to the brightness at the touch specified point T, and thus, correction is not overly performed, and an appropriate correction process may be performed at all times. Note that, in each example described above, the image correction process is expressed as the subtraction process or the like, but the actual calculation processing is not restricted to the subtraction process, and division, multiplication or the like may be performed.

In the above-described embodiments, description has been made on the image correction process performed for eliminating the negative influence of the surrounding harmful light by subtracting the accumulated image signal of the "black" region specified by the "black" region specification operation from the accumulated image signal at the region of the entire image. However, the accumulated image signal of the "black" region is not necessarily subtracted from the accumulated image signal of the region of the entire image, but the accumulated image signal of the "black" region may be subtracted from an accumulated image signal of a part of an image region including at least the "black" region. In this case, the negative influence of the surrounding harmful light can be eliminated.

Note that the present invention is not limited to the embodiments described above, and various modifications and applications may of course be realized within the scope of the invention. Furthermore, the embodiments described above include inventions at various stages, and various inventions may be extracted by appropriately combining a plurality of disclosed structural elements. For example, in the case where, even if some of the structural elements are omitted from all the structural elements indicated in the embodiment described above, the problems to be solved by the invention may be solved, and the effects of the invention may be achieved, the configuration from which the structural elements are omitted may be extracted as the invention. This invention is not restricted by any specific aspects other than the appended claims.

The procedure of each processing sequence described in each embodiment described above may be changed as long as the change does not contradict the nature of the sequence. Accordingly, with the processing sequences described above, the execution order of each of the processing steps may be changed, or a plurality of processing steps may be performed simultaneously, or the order of each of the processing steps may be different each time a series of processing sequence is performed.

That is, even if the operational flow is described in the scope of claims, specification, and drawings by using such terms as "first" and "next" for convenience, it does not mean that the operation needs to be performed in the stated order. Also, it is needless to say the each step constituting the operational flows may be omitted as appropriate if the step does not affect the essence of the invention.

Moreover, of the techniques described herein, the control and the functions described mainly with reference to the flowcharts may be, in many cases, set by programs, and the control and the functions described above may be realized by a computer reading and executing the programs. The programs may be entirely or partially recorded or stored in a portable medium such as a non-volatile memory, such as a flexible disk or a CD-ROM, a hard disk, or a storage medium such as a volatile memory, as a computer program product, and may be distributed or provided at the time of shipping or via a portable medium or a communication line.

A user may easily realize the image pickup apparatus of the present embodiments by downloading the programs via a communication network and installing the programs in a computer, or by installing the programs in a computer from a storage medium.

The present invention is not restricted to the image pickup apparatus, which is an electronic apparatus specialized in the image pickup function such as a digital camera, but may be widely applied to electronic apparatuses of other modes including the image pickup function, such as various types of electronic apparatuses with the image pickup function including a mobile phone, an audio recording apparatus, an electronic diary, a personal computer, a game console, a TV, a clock, a navigation device using GPS (global positioning system), and the like. Furthermore, it is needless to say that application to an industrial apparatus or a medical apparatus which should allow accurate observation particularly in a dark place is possible.

What is claimed is:

1. An image pickup apparatus comprising:
   an image pickup section for picking up an image of an object and acquiring an image signal responsive to receiving an instruction signal for starting a single image pickup operation;
   an accumulation section for sequentially accumulating outputs from the image pickup section during the single image pickup operation to generate an accumulated image signal;
   a display section for visibly displaying an accumulated image signal of the accumulation section as an accumulation state during the single image pickup operation;
   a position identification section for identifying a position specified on an image displayed on the display section; and
   a correction section for performing an image correction process on the accumulated image signal of the accumulation section according to an identification result of the position identification section,
   wherein the accumulation section continues accumulating outputs after the display section displays an image corrected by the correction section as an accumulated image.

2. The image pickup apparatus according to claim 1, further comprising an operation section that receives a user operation to select whether to continue or end accumulating outputs after the display section displays an image corrected by the correction section as an accumulated image.

3. The image pickup apparatus according to claim 2, wherein the display section displays an image corrected by the correction section as an accumulated image and provides a display to confirm whether or not to record the corrected image.

4. The image pickup apparatus according to claim 2, wherein the accumulated image signal of the accumulation section is a synthesis image.

5. The image pickup apparatus according to claim 2, wherein the image correction process performed by the correction section changes tone characteristics so as to decrease an image signal at a position on an image identified by the position identification section from an accumulated image signal of an entire image.

6. The image pickup apparatus according to claim 2, wherein the image correction process is performed by the correction section in consideration of gradation characteristics of the image signal.

7. The image pickup apparatus according to claim 1, wherein the display section displays an image corrected by the correction section as an accumulated image and provides a display to confirm whether or not to record the corrected image.

8. The image pickup apparatus according to claim 1, wherein the accumulated image signal of the accumulation section is a synthesis image.

9. The image pickup apparatus according to claim 1, wherein the image correction process performed by the correction section changes tone characteristics so as to decrease an image signal at a position on an image identified by the position identification section from an accumulated image signal of an entire image.

10. The image pickup apparatus according to claim 1, wherein the image correction process is performed by the correction section in consideration of gradation characteristics of the image signal.

11. An image pickup method comprising:
- picking up, with an image pickup section, an image of an object and acquiring an image signal responsive to receiving an instruction signal for starting a single image pickup operation;
- sequentially accumulating outputs from the image pickup section during the single image pickup operation to generate an accumulated image signal;
- visibly displaying the accumulated image signal as an accumulation state during the single image pickup operation;
- identifying a position specified on an image displayed to generate an identification result;
- performing an image correction process on the accumulated image signal according to the identification result to generate a corrected image; and
- displaying the corrected image,
- wherein the act of sequentially accumulating continues accumulating outputs after the display of the corrected image.

12. The image pickup method according to claim 11, further comprising:
receiving a user operation to select whether to continue or end accumulating outputs after the display of the corrected image.

13. The image pickup method according to claim 12, further comprising:
providing a display to confirm whether or not to record the corrected image.

14. The image pickup method according to claim 12, wherein the accumulated image signal is a synthesis image.

15. The image pickup method according to claim 12, wherein the image correction process changes tone characteristics so as to decrease an image signal at a position on an image identified from an accumulated image signal of an entire image.

16. The image pickup method according to claim 11, further comprising:
providing a display to confirm whether or not to record the corrected image.

17. The image pickup method according to claim 11, wherein the accumulated image signal is a synthesis image.

18. The image pickup method according to claim 11, wherein the image correction process changes tone characteristics so as to decrease an image signal at a position on an image identified from an accumulated image signal of an entire image.

* * * * *